United States Patent [19]

Franklin et al.

[11] 4,406,640
[45] Sep. 27, 1983

[54] DRIVE AXLE ASSEMBLY HAVING LIMITED TORSIONAL DAMPER

[75] Inventors: Leonard N. Franklin, Reese; Joseph A. Stearns, Frankenmuth; David J. McGregor, Saginaw, all of Mich.

[73] Assignee: General Motors Corporation, Detroit, Mich.

[21] Appl. No.: 407,040

[22] Filed: Aug. 11, 1982

Related U.S. Application Data

[63] Continuation-in-part of Ser. No. 218,517, Dec. 22, 1980, abandoned.

[51] Int. Cl.³ .............................................. F16D 3/14
[52] U.S. Cl. ........................................ 464/91; 464/89; 464/92
[58] Field of Search ................... 464/87, 89, 92, 91, 464/180, 182, 157, 147, 150

[56] References Cited

U.S. PATENT DOCUMENTS

| | | | |
|---|---|---|---|
| 1,940,884 | 12/1933 | Rosenberg | 464/89 |
| 2,691,283 | 10/1954 | Stover | 464/90 |
| 2,956,187 | 10/1960 | Wood | 464/89 x |
| 3,138,943 | 6/1964 | Gustke | 464/97 |
| 3,252,301 | 5/1966 | Herrington, Jr. | 464/88 |
| 3,263,451 | 8/1966 | Reimer | 464/89 X |
| 3,267,696 | 8/1966 | Sieja | 464/70 |
| 3,320,771 | 5/1967 | Roethlisberger et al. | 464/91 |
| 3,408,830 | 11/1968 | Sutaruk et al. | 464/180 X |
| 3,905,208 | 9/1975 | Oyama et al. | 464/88 |
| 4,183,258 | 1/1980 | Stephan | 464/89 X |
| 4,240,763 | 12/1980 | Moore | 464/91 X |

FOREIGN PATENT DOCUMENTS

| | | | |
|---|---|---|---|
| 2057632 | 4/1981 | United Kingdom | 464/89 |
| 2070194 | 9/1981 | United Kingdom | 464/91 |

OTHER PUBLICATIONS

Research disclosure of Sep. 1975 with Exhibit I, 1979, "E" car damper assembly.

Primary Examiner—Stanley N. Gilreath
Assistant Examiner—Dao Van Huynh
Attorney, Agent, or Firm—F. J. Fodale

[57] ABSTRACT

A drive axle assembly comprises a drive shaft with an integral flange at one end and a second drive shaft with an integral hollow head at an end adjacent the flange. The flange and head having cooperating lugs forming a lost motion, positive drive between the shafts. The assembly also includes a limited torsional damper comprising a shell welded to the flange, a canister welded to the head and a pair of rubber bushings compressed between the shell and the canister. The assembly has an internal spacer to maintain longitudinal alignment of the shafts and a fail safe feature which retains the shafts together in the event the rubber bushings fail.

10 Claims, 10 Drawing Figures

DRIVE AXLE ASSEMBLY HAVING LIMITED TORSIONAL DAMPER

This is a Continuation-In Part of Ser. No. 218,517, filed Dec. 22, 1980, now abandoned.

This invention relates generally to drive axle assemblies and, more particularly, to a drive axle assembly having a torsional damper which operates within the limits of a lost motion, positive drive in the drive axle assembly.

A drive axle assembly of this particular type is disclosed in U.S. Pat. No. 3,320,771 granted to Jerry M. Roethlisberger and Elmer R. Wagner on May 23, 1967 and assigned to General Motors Corporation. This patent discloses a drive axle assembly 10 comprising a pair of coaxial end-to-end drive shafts 12 and 14 which are splined to machined hubs 24 and 26 at their adjacent ends. The hubs 24 and 26 have interlocking lugs 42 and arms 52 which provide a lost motion, positive drive between the shafts 12 and 14. The assembly 10 also has a torsional damper which operates within the limits of the positive drive. This torsional damper consists of a pair of radially compressed rubber bushings 40 disposed between two sheet metal sleeves 34 and 36 welded to the machined hubs 24 and 26, respectively. The assembly also includes a fail safe feature comprising a snap ring 62 and cooperating internal groove portions 48 and 60 in the lugs 42 and arms 52.

The drive axle assembly disclosed in this patent was used successfully for several years in front wheel drive cars, such as the Oldsmobile Toronado and Cadillac Eldorado, produced by the assignee.

The axle assembly, however, is relatively heavy due primarily to the massive hubs 24 and 26, which are splined to the ends of the shafts 12 and 14. The assembly is also expensive to manufacture because of the splines and several snap rings and cooperating grooves which retain the hubs 24 and 26 on the shafts and provide the fail safe feature.

An important object of this invention is to provide a drive axle assembly which is much lighter in weight so that it contributes to fuel efficiency when used in an automobile, particularly a front wheel drive automobile.

Another object of this invention is to provide a drive axle assembly which reduces manufacturing costs by eliminating the need for splines, grooves and snap rings.

A feature of the invention is that the positive drive members are reduced in mass and formed as integral parts of the axle shafts.

Another feature of the invention is the incorporation of a spacer to prevent noise associated with metal-to-metal contact during operation and also to take-up clearances and maintains the shafts aligned when subjected to a bending couple.

Another feature of the invention is the incorporation of a fail safe device which retains the shafts together longitudinally in the event the rubber bushings fail.

Other objects and features of the invention will become apparent to those skilled in the art as the disclosure is made in the following detailed description of a preferred embodiment of the invention as illustrated in the accompanying sheets of drawing in which.

Figure 1:
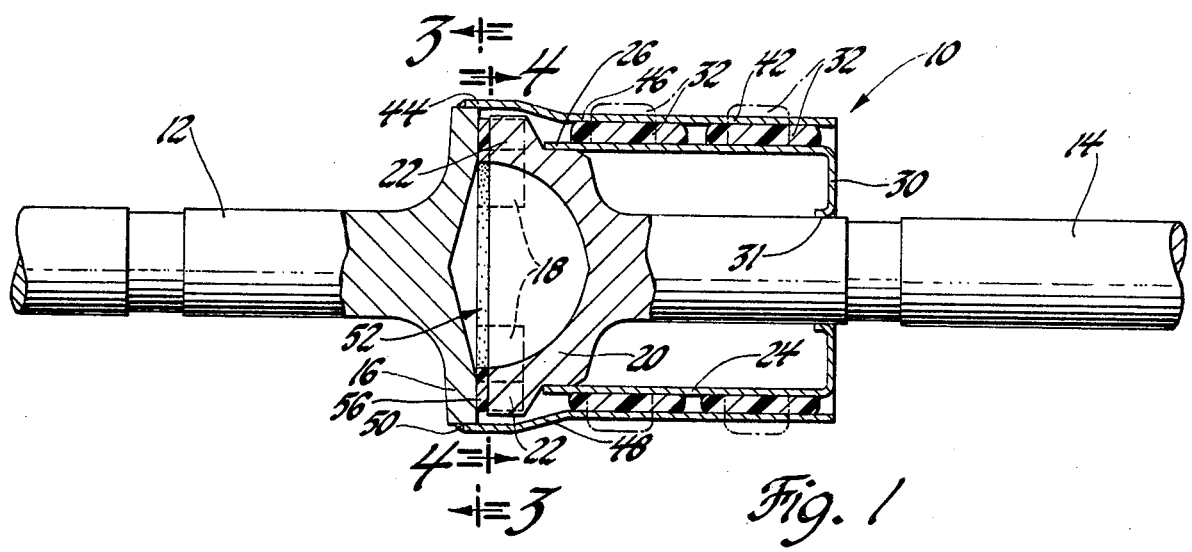
FIG. 1 is a longitudinal section of a drive axle assembly in accordance with this invention.

Referring now to FIGS. 1 through 5 of the drawing, the first drive axle assembly 10 comprises drive shafts 12 and 14 which are coaxially aligned in an end-to-end relationship.

The drive shaft 12 is a machined steel forging which is formed with an integral radial flange 16 at one end. The flange 16 has four, spaced, axial drive lugs 18 at its outer end.

Figure 4:
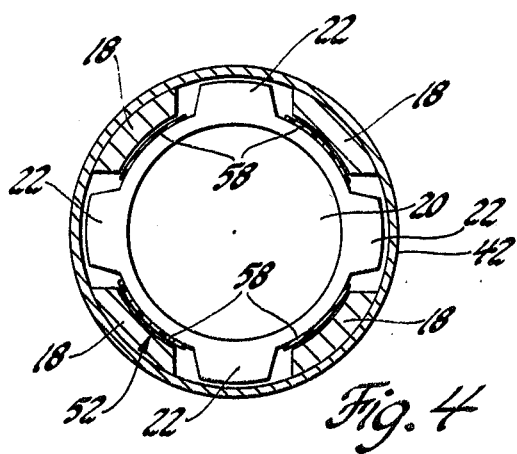
FIG. 4 is a section taken substantially along the line 4—4 of FIG. 1 looking in the direction of the arrows.

The drive shaft 14, also a machined steel forging, is formed with an integral hollow bell-shaped head 20 at one end. The hollow bell-shaped head 20 has four, spaced, radial drive lugs 22 which are disposed in the spaces between the axial drive lugs 18 as shown in FIG. 4. The lugs 18 and 22 provide a lost motion, positive drive between the drive shafts 12 and 14.

The drive shaft 14 carries a sheet metal canister 24. The open end of the canister 24 is mounted on a cylindrical land 26 of the bell-shaped head 20 with a snug or light press fit and then laser welded to the head 20 at 28. The bottom wall 30 of the canister 24 has a flanged aperture 31 which seats on the shaft 14 with a close or sliding fit to support this end of the canister.

Two rubber bushings 32 are mounted on the canister 24 longitudinally spaced from each other. The rubber bushings 32 are radially compressed tightly by a sheet metal sleeve 42 attached to the radial flange 16 of the shaft 12. The sleeve 42 has a short end portion 44 of larger diameter connected to an elongated end portion 46 of smaller diameter by a tapered portion 48. The larger diameter end portion 44 is pressed on a cylindrical periphery of the radial flange 16 and laser welded thereto at 50. The smaller diameter end portion 46 which compresses the rubber bushings 32 has an inner diameter which is less than the outer diameter of the radial lugs 22. This is a fail safe feature to retain the shafts 12 and 14 together longitudinally in the event that the rubber bushings 32 fail.

Figure 2:
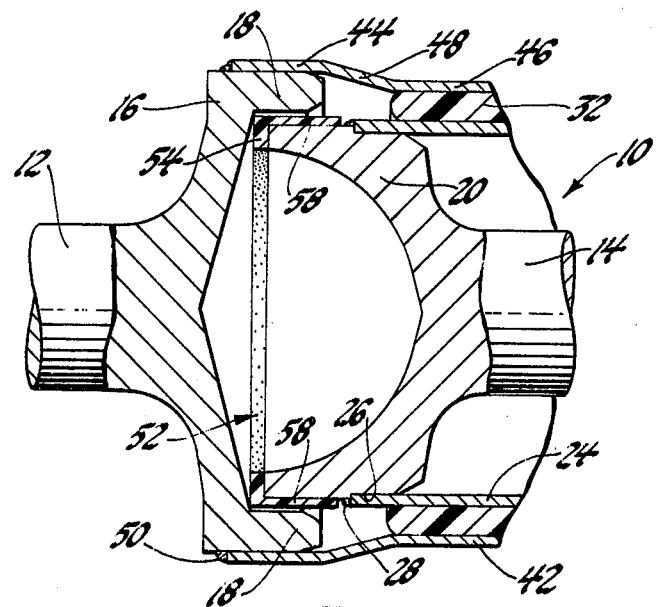
FIG. 2 is a longitudinal section of part of the drive axle assembly taken on a plane 45° from the plane of FIG. 1.
Figure 3:
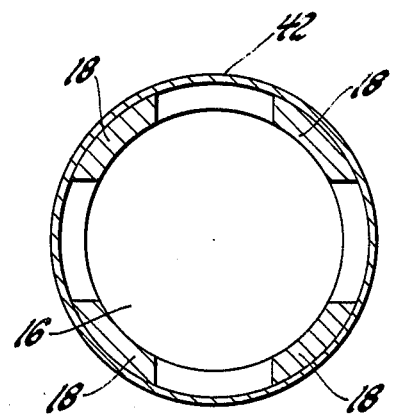
FIG. 3 is a section taken substantially along the line 3—3 of FIG. 1 looking in the direction of the arrows.

The drive axle assembly 10 also includes a spacer 52 between the confronting end faces of the radial flange 16 and the hollow bell-shaped head 20. The spacer 52, which may be made of nylon or any other suitable thermoplastic material, comprises a ring portion 54 having four radial projections 56 which match the shape of the radial lugs 22. The spacer 52 also has four longitudinal fingers 58 which fit between the radial lugs 22 and grip the head 20 to position the spacer 52 as shown in FIGS. 2 and 4.

The drive axle assembly 10 may be assembled in the following manner. A pair of unstressed rubber bushings 32 (shown by the phantom lines in FIG. 1) are mounted on the canister 24 and glued or cemented in place. The canister 24 is then slid onto the shaft 14 until the open end of the canister 24 is firmly seated on the land 26 of the head 20 against the shoulder 27. The canister 24 is then laser welded at 28. The spacer 52 may then be mounted on the head 20.

The sleeve 42 is then assembled onto the rubber bushings 32 and it must be assembled before being attached to the radial flange 16 because of the fail safe feature. The sleeve 42 is assembled by compressing the rubber bushings 32 radially in a suitable fixture and pressing the sleeve 42, large diameter end portion 44 first, over the rubber bushings 32. The tapered portion 48 of the sleeve 42 facilitates the pressing operation. It is also important that a longitudinal spacing be provided between the tapered portion 48 and the radial lugs 22 as shown in FIG. 1. This spacing is necessary because the sleeve 42 is first over pressed to bottom on the tapered portion 48 and then back pressed to the position shown in FIG. 1 so that a desired V-shaped fiber distortion is produced in the compressed rubber bushings 32. The longitudinal spacing, as shown in FIG. 1, is also limited so that the lugs 18 and 22 are still engaged when the head 20 engages the tapered portion 48. Thus, in the event the rubber bushings 32 fail, the shafts 12 and 14 are drivingly connected as well as not only held together longitudinally.

After the sleeve 42 is back pressed to the proper position, the axial lugs 18 are properly aligned with spaces between the radial lugs 22 and the radial flange 16 is pushed into the sleeve portion 44, preferably with a light interference fit, until the radial flange 16 bottoms on the plastic spacer 52. The sleeve 42 is then laser welded to the radial flange 16 at 50.

The function of the plastic spacer 52 is to prevent noise associated with metal-to-metal contact during operation and also to take-up the clearance between the flange 16 and the head 20. The clearance take-up maintains the shafts 12 and 14 in alignment when subjected to a bending couple.

Referring now to FIGS. 6 through 10 of the drawing, a second drive axle assembly 100 comprises drive shafts 112 and 114 which are coaxially aligned in an end-to-end relationship.

The drive shaft 112 is a machined steel forging which is formed with an integral radial flange 116 at one end. The flange 116 has four, spaced, axial drive lugs 118 at its outer end.

Figure 9:
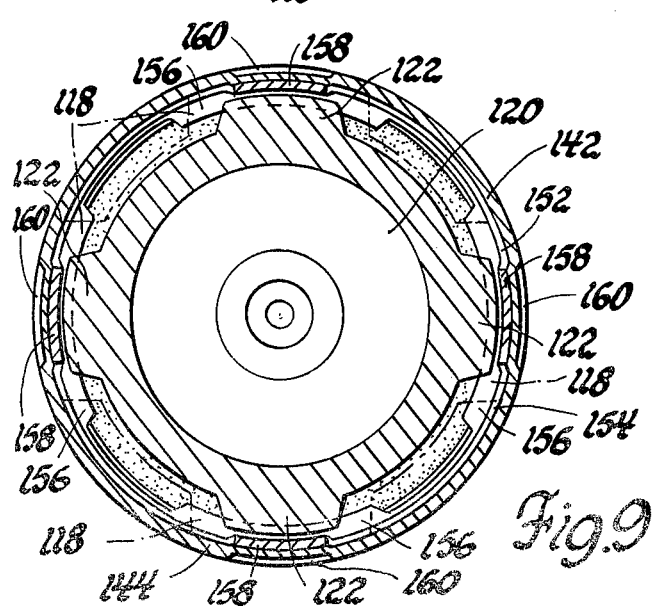
FIG. 9 is a section taken substantially along the line 9—9 of FIG. 6 looking in the direction of the arrows.
Figure 10:
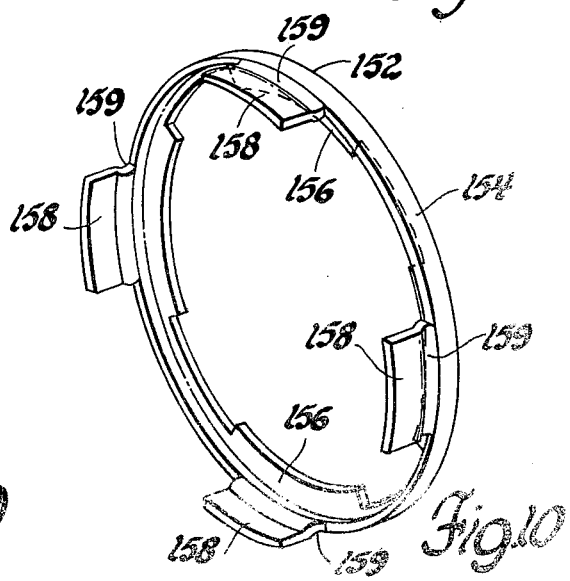
FIG. 10 is a perspective view of a component of the drive axle assembly.

The drive shaft 114, also a machined steel forging, is formed with an integral hollow bell-shaped head 120 at one end. The hollow bell-shaped head 120 has four, spaced, radial drive lugs 122 which are disposed in the spaces between the axial drive lugs 118 as shown in FIG. 9. The lugs 118 and 122 provide a lost motion, positive drive between the drive shafts 112 and 114.

The drive shaft 114 carries a sheet metal canister 124. The open end of the canister 124 is mounted on a cylindrical land 126 of the bell-shaped head 120 with a snug or light press fit and then laser welded to the head 120 at 128. The bottom wall 130 of the canister 124 has four circumferentially spaced, oval shaped, holes 131 to reduce weight. The bottom wall 130 also has a central aperture 132 defined by flange 133 which extends inside the canister 124 in a divergent manner. The flange 133 seats on the shaft 114 with a close or sliding fit to support this end of the canister and the divergent shape of the flange 133 facilitates insertion of the shaft 114 into the central aperture 132 during assembly.

Two rubber bushings 134 are mounted on the canister 124 longitudinally spaced from each other. The rubber bushings 134 are radially compressed tightly by a sheet metal sleeve 142 attached to the radial flange 116 of the shaft 112. The sleeve 142 has a short end portion 144 of larger diameter connected to an elongated end portion 146 of smaller diameter by a generally radial portion 148 which provides an internal shoulder 149 in the sleeve 142. The larger diameter end portion 144 is pressed on a cylindrical periphery of the radial flange 116 and laser welded thereto at 150. The smaller diameter end portion 146 compresses the rubber bushings 134 and has an inner diameter which is greater than the outer diameter of the lugs 122 for assembly purposes.

The axle damper assembly 100 also includes a hardened steel stop member 152 which fits inside the larger diameter end portion 144 of the sleeve 142 against the shoulder 149.

The stop member 152 comprises an annular body 154 which has four depending tabs 156 which extend radially inwardly from one end and four peripheral fingers 158 which extend longitudinally from an opposite end.

Figure 6:
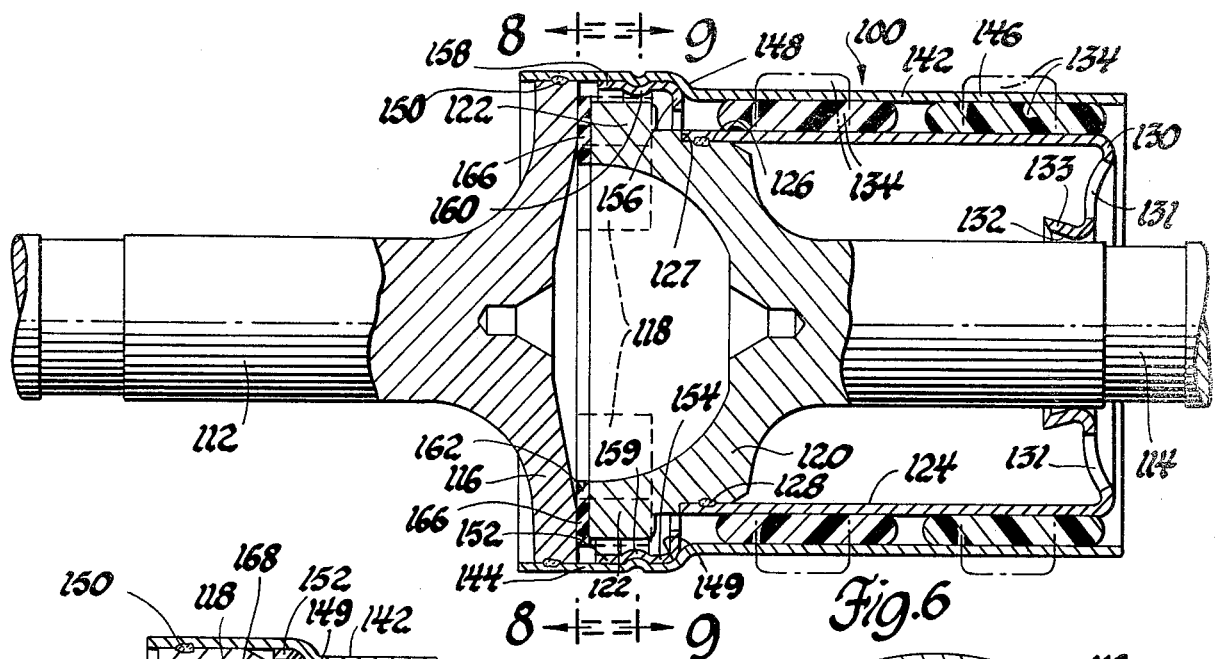
FIG. 6 is a longitudinal section of a second drive axle assembly in accordance with this invention.
Figure 7:
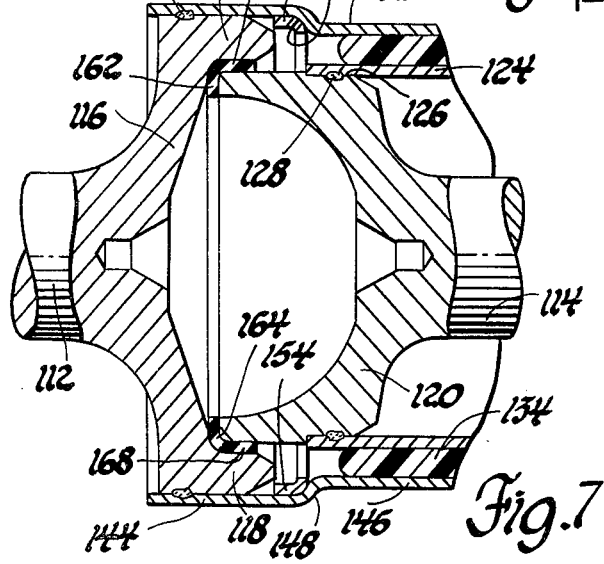
FIG. 7 is a longitudinal section of part of the second drive axle assembly taken on a plane 45° from the plane of FIG. 6.
Figure 8:
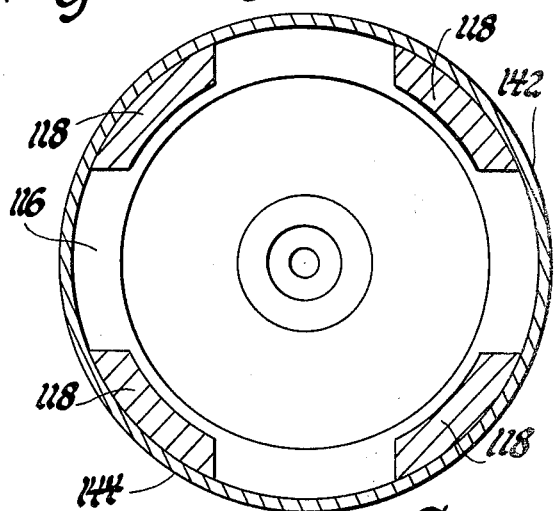
FIG. 8 is a section taken substantially along the line 8—8 of FIG. 6 looking in the direction of the arrows.

The tabs 156 are spaced apart so that the radial drive lugs 122 of the shaft 114 pass between the tabs 156 during assembly of the stop member 152 into the retained position in the sleeve 142 shown in FIGS. 6, 7 and 9. In the retained position, stop member 152 is indexed so that the four tabs 156 are located behind and spaced from the respective radial drive lugs 122 for engagement thereby to provide a fail safe feature which retains the shafts 112 and 114 together longitudinally in the event that the rubber bushings 134 fail. The tabs 156 are also located close enough to the drive lugs 122 so that when the drive lugs 122 and tabs 156 engage, the drive lugs 122 still engage the drive lugs 118. This provides for the shafts 112 and 114 being drivingly connected in the failed mode.

The fingers 158 are depressed radially inwardly at their root portions to provide circumferential channels 159. The channels 159 cooperate with four circumferential indents 160 in the sleeve 142 to retain the stop member 152 in the sleeve 142 against the shoulder 149. The circumferential width of the fingers 158 is less than the circumferential width of the radial drive lugs 122 as shown in FIG. 9 so that the fingers 158 are not engaged by the axial drive lugs 118 during normal operation of the drive axle assembly.

Figure 5:
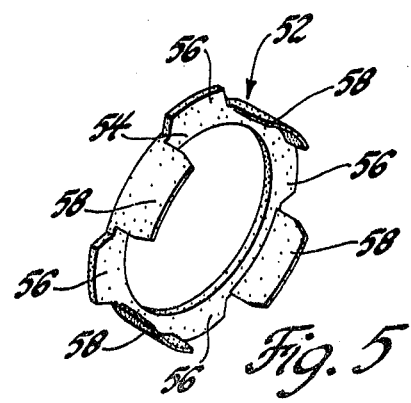
FIG. 5 is a perspective view of a component of the drive axle assembly.

The drive axle assembly 100 further includes a spacer 162 between the confronting end faces of the radial flange 116 and the hollow bell-shaped head 120. The spacer 162 is identical to the spacer 52 used in the drive axle assembly 10 as shown in FIG. 5. Spacer 162, which may be made of nylon or any other suitable thermoplastic material, also comprises a ring portion 164 having four radial projections 166 which lie against the respective faces of the radial lugs 122. The spacer 162 also has four longitudinal fingers 168 which fit between the radial lugs 122 and grip the head 120 to position the spacer 52 as shown in FIGS. 6, 7 and 9. As in the previous embodiment, the plastic spacer 162 takes-up clearance between the flange 16 and the head 20 so as to maintain the shafts 112 and 114 aligned when subjected to a bending couple. It also eliminates noise associated with metal-to-metal contact.

The drive axle assembly 100 is assembled in the following manner. A pair of unstressed rubber bushings 134 (shown by the phantom lines in FIG. 6) are mounted on the canister 124 and glued or cemented in place. The canister 124 is then slid onto the shaft 114 until the open end of the canister 124 is firmly seated on the land 126 of the head 120 against the shoulder 127. The canister 124 is then laser welded at 128.

The sleeve 142 is then assembled onto the rubber bushings 134 by compressing the rubber bushings 134 radially in a suitable fixture and pressing the sleeve 142 over the rubber bushings 134. The sleeve 142 is first over pressed in one direction and then back pressed to the position shown in FIG. 6 so that a desired V-shaped fiber distortion is produced in the compressed rubber bushings 134.

Since the smaller diameter portion 146 in this embodiment is larger than the outer diameter of the lugs 122, the sleeve 142 may be pressed onto the rubber bushings 134 in either direction and then back pressed in the opposite direction. Consequently, the sleeve 142 can be over pressed and back pressed to a greater extent than the sleeve 42 in the first embodiment.

After the sleeve 142 is back pressed to the proper position, the hardened steel stop member 152 is assembled by inserting the stop member 152 into the larger diameter portion 144 with the tabs 156 oriented to pass between the lugs 122. When the stop member 152 engages the shoulder 149, it is then indexed about 45° which aligns the tabs 156 with the lugs 122 and also engages the circumferential indents 160 of the sleeve 142 in the channels 159 to retain the stop member 152 in place.

The plastic spacer 162 is then mounted on the head 120 after which the flange 116 of the axle shaft 112 is inserted into the open end of the large diameter portion 144 of the sleeve 122 until it bottoms on the plastic spacer 162. During insertion, the flange 116 is oriented so that the axial drive lugs 118 enter between the spaces between the radial drive lugs 122 and the fingers 158. After insertion, the sleeve 142 is laser welded to the radial flange 116 at 150.

We wish it to be understood that we do not desire to be limited to the exact details of construction shown and described, for obvious modifications will occur to a person skilled in the art.

The embodiment of the invention in which an exclusive property or privilege is claimed are defined as follows:

1. A drive axle assembly having a limited torsional damper comprising;
   a first drive shaft having an integral radial flange at one end,
   a second drive shaft having an integral hollow head at an end adjacent the integral radial flange of the first drive shaft,
   said radial flange and said hollow head having lugs which cooperate to provide a lost motion, positive drive between said drive shafts,
   a canister secured to said hollow head at one end and supported on said second drive shaft at the other end,
   a sleeve having an elongated end portion surrounding the canister and an opposite end portion of larger diameter secured to said radial flange,
   radially compressed elastomeric bushing means disposed between the elongated end portion and the sleeve and the canister for transmitting torque and damping the torque transmitted between the axles until cooperating lugs of the flange and the hollow head engage to provide positive drive between the drive shafts, and
   a stop inside the sleeve which is engageable with said head to prevent longitudinal separation of the drive shafts, in the event the compressed elastomeric bushing means fail.

2. A drive assembly as defined in claim 1 wherein the stop is a tapered portion of the sleeve between the elongated end portion and the opposite end portion of larger diameter.

3. A drive assembly as defined in claim 1 wherein the stop comprises a separate stop member disposed and retained in the sleeve.

4. A drive axle assembly having a limited torsional damper comprising;
   a first drive shaft having an integral radial flange at one end,
   a second drive shaft having an integral hollow head at an end adjacent the integral radial flange of the first drive shaft,
   said radial flange and said hollow head having longitudinal and radial lugs, respectively, which cooperate to provide a lost motion, positive drive between said drive shafts,
   a canister secured to said hollow head at one end and supported on said second drive shaft at the other end,
   a sleeve having an elongated end portion surrounding the canister and an opposite end portion of larger diameter secured to said radial flange,
   a spacer between the radial flange and the head to take-up clearance therebetween and maintain the drive shafts aligned when subjected to a bending moment,
   radially compressed elastomeric bushing means disposed between the elongated end portion and the sleeve and the canister for transmitting torque and damping the torque transmitted between the axles until cooperating lugs of the flange and the hollow head engage to provide positive drive between the drive shafts, and
   a stop inside the sleeve which is engageable with said head to prevent longitudinal separation of the drive shafts, in the event the compressed elastomeric bushing means fail.

5. A drive assembly as defined in claim 4 wherein the spacer is thermoplastic so as to prevent noise associated with metal-to-metal contact between the radial flange and the head.

6. A drive assembly as defined in claim 5 wherein the stop is a tapered portion of the sleeve between the elongated end portion and the opposite end portion of larger diameter.

7. A drive assembly as defined in claim 5 wherein the stop comprises a separate stop member disposed and retained in the sleeve.

8. A drive assembly as defined in claim 5 wherein said stop is spaced sufficiently close to said head so that the lugs are engageable when the stop is engaged by the head to provide a driving connection between the shafts when the compressed elastomeric bushing means fail.

9. A drive axle assembly having a limited torsional damper comprising;
   a first drive shaft having an integral radial flange at one end, said flange having longitudinal lugs at its outer end, a second drive shaft having an integral hollow head at an end adjacent the integral radial flange of the first drive shaft, said hollow head having radial lugs which cooperate with the longitudinal lugs to provide a lost motion, positive drive between said drive shafts, a canister welded to said hollow head at one end and supported on said second drive shaft at the other end, a sleeve having an elongated end portion surrounding the canister and an opposite end portion of larger diameter welded to said radial flange, and a pair of radially compressed elastomeric bushings disposed between the elongated end portion of the canister and the sleeve for transmitting torque and damping the torque transmitted between the axles until cooperating lugs of the flange and the hollow head engage to provide positive drive between the drive shafts, said sleeve having a tapered portion between said end portions which is spaced from said head in the longitudinal direction to permit said sleeve being over pressed and then back pressed on the elastomeric bushings during assembly, said tapered portion being spaced sufficiently close to said head to engage therewith and maintain engagement of said lugs, in the event the compressed elastomeric bushings fail.

10. A drive axle assembly having a limited torsional damper comprising;

a first drive shaft having an integral radial flange at one end, said flange having longitudinal lugs at its outer end, a second drive shaft having an integral hollow head at an end adjacent the integral radial flange of the first drive shaft, said hollow head having radial lugs which cooperate with the longitudinal lugs to provide a lost motion, positive drive between said drive shafts, a canister welded to said hollow head at one end and supported on said second drive shaft at the other end, a sleeve having an elongated end portion surrounding the canister and an opposite end portion of larger diameter welded to said radial flange, a pair of radially compressed elastomeric bushings disposed between the elongated end portion of the canister and the sleeve for transmitting torque and damping the torque transmitted between the axles until cooperating lugs of the flange and the hollow head engage to provide positive drive between the drive shafts, said elongated end portion having an inner diameter which is greater than the outer diameter of the radial lugs to permit said sleeve being over pressed onto the elastomeric bushings in either direction during assembly, a stop member having depending tabs which extend radially inwardly of the radial lugs and which are sized to pass between the radial lugs during assembly, means for retaining the stop member in the sleeve in an indexed position when said tabs lie behind and spaced from the respective radial lugs, and said tabs being spaced sufficiently close to said radial lugs to engage therewith in the event the compressed elastomeric bushings fail so as to prevent longitudinal separation of the drive shafts and to maintain driving engagement of the lugs.

* * * * *